United States Patent [19]
Marren et al.

[11] Patent Number: 5,716,230
[45] Date of Patent: Feb. 10, 1998

[54] SURFACE ENGAGEABLE ELECTRICAL CONNECTOR

[75] Inventors: Feargal Marren, Newmarket-On-Fergus; Matthew Wilhite, Ballyclough, both of Ireland

[73] Assignee: Molex Incorporated, Lisle, Ill.

[21] Appl. No.: 459,904

[22] Filed: Jun. 2, 1995

[51] Int. Cl.⁶ .................................................. H01R 3/00
[52] U.S. Cl. .............................. 439/500; 439/862
[58] Field of Search ............................. 439/500, 929, 439/65, 79, 80, 862, 629

[56] References Cited

U.S. PATENT DOCUMENTS

| | | | |
|---|---|---|---|
| 3,444,502 | 5/1969 | Matthews | 339/17 |
| 4,083,011 | 4/1978 | Ferrell et al. | 439/500 |
| 4,904,192 | 2/1990 | Holden et al. | 439/78 |
| 5,127,849 | 7/1992 | Karl et al. | 439/500 |
| 5,186,654 | 2/1993 | Enomoto et al. | 439/570 |
| 5,259,769 | 11/1993 | Cruise et al. | 439/65 |
| 5,338,230 | 8/1994 | Bryce et al. | 439/629 |

FOREIGN PATENT DOCUMENTS 0413156  2/1991  European Pat. Off. ............. 439/80

*Primary Examiner*—Neil Abrams
*Assistant Examiner*—Eugene Byrd
*Attorney, Agent, or Firm*—Stephen Z. Weiss

[57] ABSTRACT

An electrical connector includes a dielectric housing having a mounting face adapted for surface mounting on a printed circuit board. A conductive terminal is mounted on the housing and includes a board contact portion for engagement with a circuit trace on the printed circuit board and a spring contact portion for engagement with a contact element of a mating connector component. The board contact portion is fixed at the mounting face of the housing and is adapted to engage the circuit trace on the printed circuit board when the contact portion is moved in a direction generally perpendicular to the board. The spring contact portion of the terminal projects from a side of the housing and is adapted to engage the contact element of the mating connector component when the contact element is moved in a direction generally parallel to the board.

17 Claims, 3 Drawing Sheets

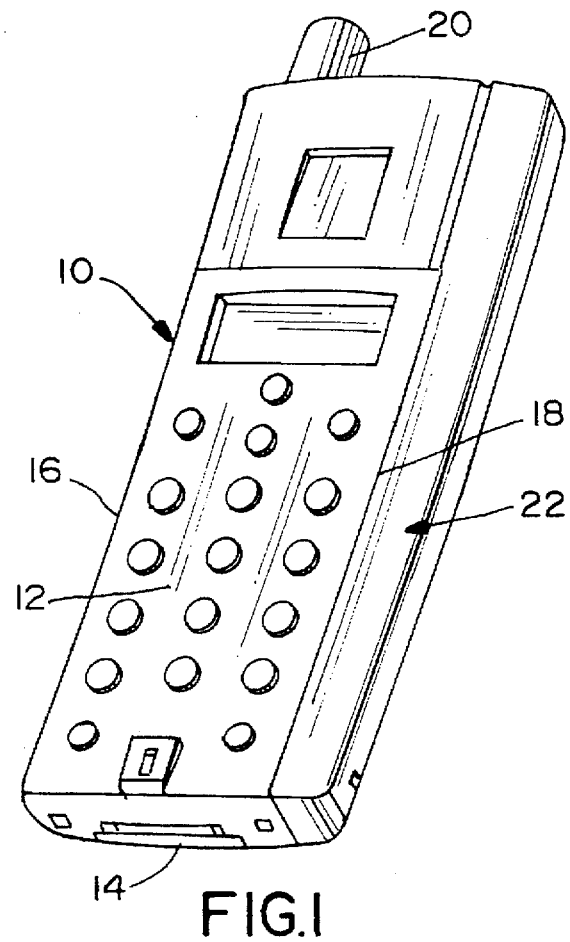
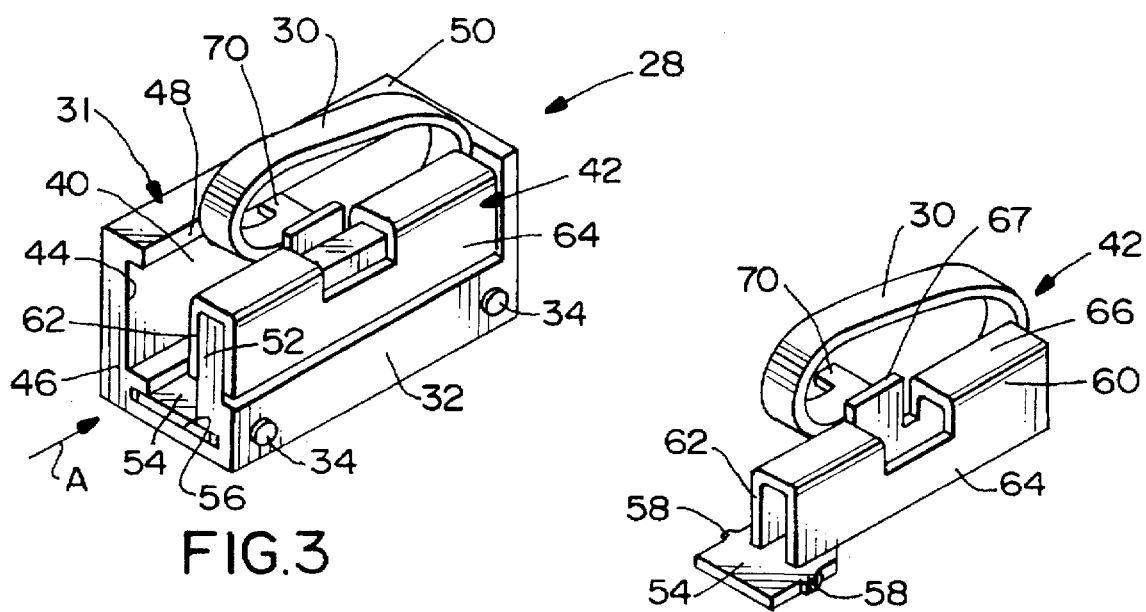

5,716,230

1

SURFACE ENGAGEABLE ELECTRICAL CONNECTOR

FIELD OF THE INVENTION

This invention generally relates to the art of electrical connectors and, particularly, to an electrical connector which includes a flexible terminal having a spring contact portion which is surface engageable with a contact element of a mating connector component.

BACKGROUND OF THE INVENTION

There are a variety of electrical connectors which have flexible terminals with spring contact portions provided for surface engagement with a contact element of a mating connector component. Although, theoretically, any pair of interengaging contacts necessarily are surface engageable, such terms as "surface engagement" or the like herein are meant to define interengaging contacts wherein the contact surfaces engage in a generally perpendicular or abutting relationship, versus contacts which slide over each other during mating such as pin and socket contacts.

For instance, in a portable or mobile telephone apparatus, a handset conventionally is inserted into a cradle, whereby fairly rigid, usually planar, contacts are moved into abutment ("surface engagement") with flexible contacts in the cradle of the base unit. Another example is in a battery charger for various applications, such as telephones, video recorders, or the like, wherein a battery pack has fairly rigid planar contacts movable into abutting surface engagement with flexible contacts of a battery recharger. A further example is in the battery pack, itself, which has contact elements surface engageable with contacts on the handset of the portable or mobile telephone apparatus.

In such environments as mobile telephone apparatus, one of the dominant design considerations is the overall size of the apparatus, particularly the handset and its associated battery pack. In essence, a smaller handset is easier to sell. Heretofore, battery packs predominantly have been mounted to the rear of the handset. In other words, the battery pack has been mounted to the back of the handset opposite the front "dialing face" of the handset. With such an arrangement and the orientation of the internal printed circuit board, the battery pack and its contacts have been surface engageable with contacts of connectors on the handset, in directions generally perpendicular to the planar printed circuit board. This typical arrangement causes problems or creates considerable restrictions on the ever-increasing demand to miniaturize or down-size the handset assembly.

The present invention is directed to solving these problems and satisfying a need for a connector which will allow a battery pack to be mounted to a side edge of the handset, or in other connector applications, so that the interengaging contacts are surface engageable in a direction generally parallel to the internal printed circuit board allowing a battery pack to be mated on its longitudinal side.

SUMMARY OF THE INVENTION

An object, therefore, of the invention is to provide a new and improved surface engageable electrical connector of the character described.

In the exemplary embodiment of the invention, an electrical connector is provided with a dielectric housing having a mounting face adapted for surface mounting on a printed circuit board. A conductive terminal is mounted on the housing and includes a board contact portion for engagement with a circuit trace on the printed circuit board and a spring contact portion for engagement with a contact element of a mating connector component. The invention contemplates that the board contact portion of the terminal be fixed at the mounting face of the housing and be adapted to engage the circuit trace on the printed circuit board when the mounting face is in a plane parallel to the plane of the board. The invention contemplates that the spring contact portion of the terminal project from a side of the housing and be adapted to engage the contact element of the mating connector component when the contact element is moved in a direction generally parallel to the board.

As disclosed herein, the housing includes a terminal-receiving cavity, and the terminal includes a base fixed within the cavity. The spring contact portion of the terminal projects outwardly through an opening in the side of the housing. The board contact portion of the terminal also projects through the opening in the side of the housing and is reversely turned over the mounting face of the housing. Specifically, the board contact portion comprises one leg of a U-shaped section of the terminal which embraces a wall of the housing.

The invention contemplates that the spring contact portion of the terminal be bowed outwardly of the side of the housing. A free end of the spring contact portion has a tab seated beneath a ledge extending parallel to the board on the housing to preload the spring contact portion.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of a mobile telephone handset having a battery pack secured to a side edge thereof and between which the electrical connector of the invention is incorporated;

FIG. 3 is a perspective view of the electrical connector embodying the concepts of the present invention;

FIG. 3A is a perspective view of the terminal removed from the housing as depicted in FIG. 3;

DETAILED DESCRIPTION OF THE PREFERRED EMBODIMENT

Figure 2:
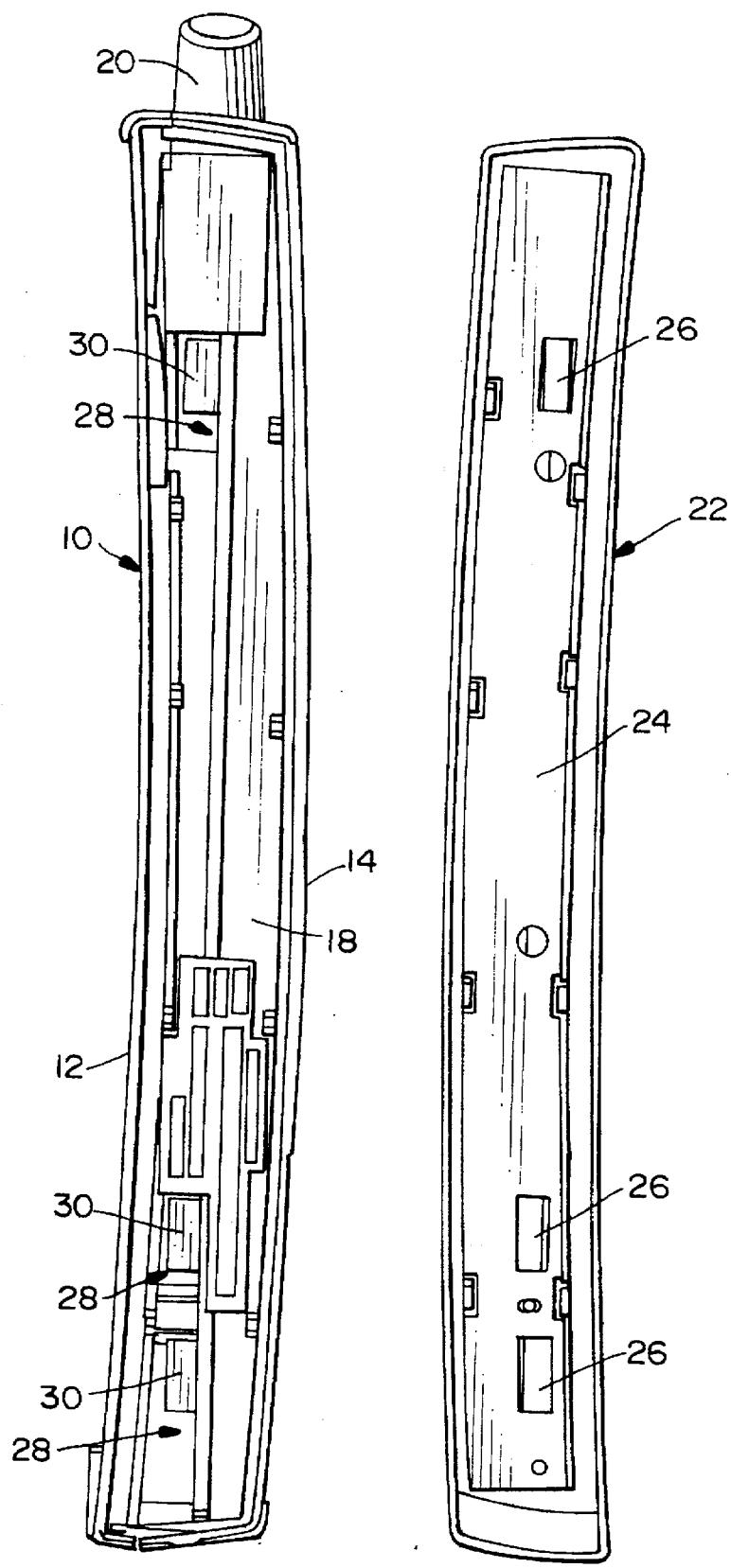
FIG. 2 is an enlarged depiction of the opposing mounting faces of the handset and the battery pack.

Referring to the drawings in greater detail, and first to FIG. 1, the electrical connector of the invention is particularly applicable for use in a handset, generally designated 10, of a mobile telephone apparatus. The handset has a front dialing face 12, a rear face 14, side edges 16 and 18 and an antenna boss 20 at one end or top of the handset. A thin elongated battery pack, generally designated 22, is secured along one side edge 18 of handset 10.

It immediately can be seen that handset 10 in FIG. 1 is extremely thin. That is due to the mounting of battery pack 22 along side edge 18 of the handset. In other words, heretofore, battery packs predominantly have been mounted to the rear face 14 of the handset, opposite the dialing face 12. This created a rather bulky, thick overall envelope, and electrical connections between the battery pack and the handset were made in directions generally perpendicular to an internal planar printed circuit board extending generally parallel to the front and rear faces of the handset.

Referring to FIG. 2 in conjunction with FIG. 1, battery pack 22 is shown in FIG. 2 removed from handset 10. The battery pack has a mounting face 24 which mounts to side edge 18 of the handset. The battery pack has a plurality of exposed mating contacts 26 engageable with the spring contact elements of the electrical connectors in handset 10 according to the concepts of the invention and described in detail below. Suffice it to say, a plurality of electrical connectors, generally designated 28, are mounted within handset 10, and each connector includes a spring contact 30 which is surface engageable with a respective one of the mating contacts 26.

Figure 4:
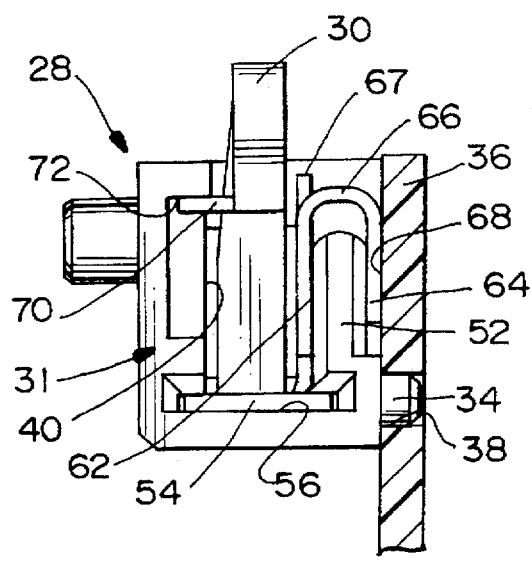
FIG. 4 is an end elevational view of the connector, looking toward the left-hand end of FIG. 3, and with the connector mounted to a printed circuit board.
Figure 5:
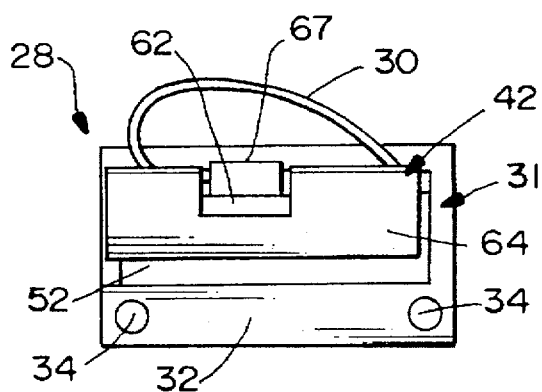
FIG. 5 is a side elevational view of the electrical connector.
Figure 5A:
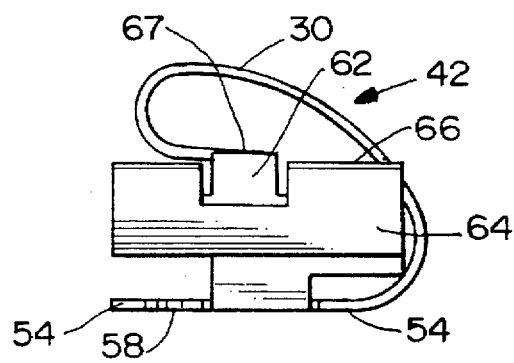
FIG. 5A is a side elevational view of the terminal removed from the housing as depicted in FIG. 5.

More particularly, referring to FIGS. 3–5, each electrical connector 28 includes a dielectric housing, generally designated 31, which includes a mounting face 32 having mounting pegs 34 adapted for surface mounting the connector on a printed circuit board 36 (FIG. 4) with the mounting pegs 34 insertable into mounting holes 38 in the board. The housing further includes a terminal-receiving cavity 40 into which a terminal, generally designated 42, is insertable through an opening 44 in an end 46 of the housing. Another opening 48 extends lengthwise of the housing and communicates with the cavity through a side 50 of the housing generally perpendicular to the mounting face 32. A wall 52 of the housing extends along opening 48.

Referring to FIGS. 3A–5A in conjunction with FIGS. 3–5, terminal 42 includes a base 54 which is positioned in a slot 56 at the bottom of cavity 40 of the housing when the terminal is inserted into the housing in the direction of arrow "A" (FIG. 3). The housing preferably is unitarily molded of dielectric plastic material or the like, and terminal 42 preferably is stamped and formed of conductive sheet metal material. Base 54 of the terminal includes a set of teeth 58 (FIG. 3A) at the side edges of the base for skiving into the plastic material of the housing along the sides of slot 56 to secure the terminal to the housing substantially within cavity 40.

Terminal 42 further includes a generally U-shaped section 60 defining a pair of leg portions 62 and 64 joined by a bight portion 66. Leg portion 62 extends from a portion of base 54. When the terminal is mounted on the housing, leg portions 62 and 64 embrace wall 52 of the housing. Leg portion 64 forms a board contact portion of terminal 42 and is fixed at mounting face 32 of the housing. The leg or board contact portion 64 is adapted to engage a circuit trace on printed circuit board 36, as at 68 in FIG. 4.

Terminal 42 still further includes spring contact portion 30 which extends from a portion of base 54 and outwardly through opening 48 in side 50 of housing 31. As stated above, the spring contact portion is adapted to engage a respective one of the mating contact elements 26 (FIG. 2 and FIG. 6) of battery pack 22. The spring contact portion has an outwardly bowed configuration adapted to be cantilevered from base 54 of the terminal. Therefore, the spring contact portion will effect a wiping action upon engaging its mating contact element 26 of the battery pack to facilitate removing contaminants from the engaging contacts.

Figure 4A:
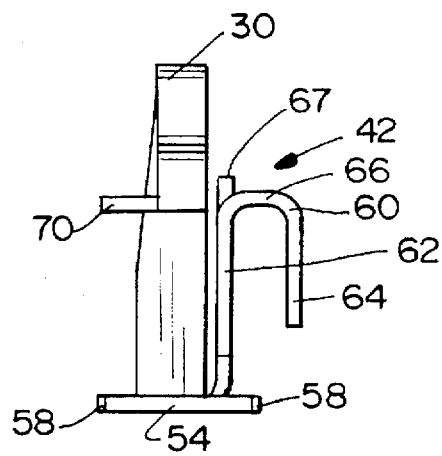
FIG. 4A is an end elevational view of the terminal removed from the housing as depicted in FIG. 4.

As best seen in FIGS. 4 and 4A, a tab 70 projects transversely outwardly near the free end of bowed spring contact portion 30. This tab seats beneath a ledge 72 of housing 31 extending parallel to the printed circuit board 36, as seen best in FIG. 4, in order to preload spring contact portion 30. Shelf 67 which is an extension of leg 62 helps to align the free end of spring contact portion 30 thereby preventing tab 70 from moving laterally from beneath ledge 72 so that preloading on the terminal is not lost.

Figure 6:
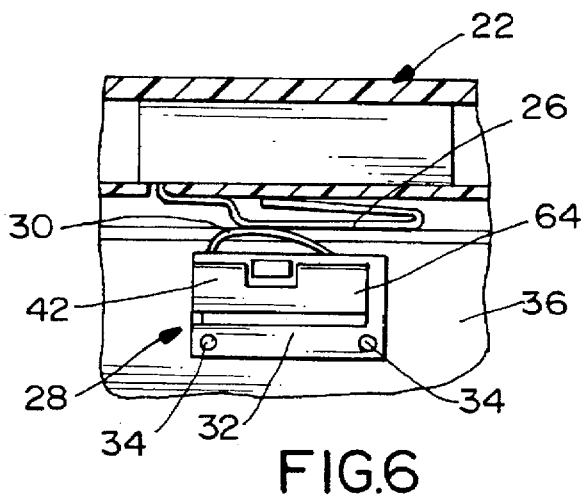
FIG. 6 is a side elevational view of the connector (similar to that of FIG. 5) in surface engagement with a contact element of the battery pack.

Lastly, FIG. 6 shows spring contact portion 30 of terminal 42 of one of the connectors 28 in surface engagement with one of the mating contact elements 26 of battery pack 22. Printed circuit board 36 is shown in phantom. Whereas board contact portion 64 of the terminal engages a circuit trace on the printed circuit board in a direction generally perpendicular to the board, spring contact portion 30 engages mating contact element 26 in a direction generally parallel to the board. Therefore, battery pack 22 can be mounted along a thin edge 18 of the telephone handset as described above and shown in FIG. 1.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an electrical connector which includes
   a dielectric housing having a mounted face adapted for surface mounting on a printed circuit board,
   a conductive terminal mounted on the housing and including a board contact portion for engagement with a circuit trace on the printed circuit board and a spring contract portion for engagement with a contact element of a mating connector component,
   wherein the improvement comprises
   said board contact portion of the terminal being fixed at the mounting face of the housing and arranged so that the plane of the board contact portion will be parallel to the plane of the board when the housing is mounted to the board, and
   said spring contact portion of the terminal projecting from a side of the housing having a bend axis perpendicular to the plane of the printed circuit board, and adapted to engage the contact element of the mating connector component when the contact element is moved in a direction generally parallel to the board.

2. In a electrical connector as set forth in claim 1, wherein said spring contact portion of the terminal is bowed outwardly of said side of the housing.

3. In an electrical connector as set forth in claim 1, wherein said spring contact portion of the terminal includes a tab, extending laterally from the spring contact portion, seated beneath a edge extending parallel to the board on the housing to preload the spring contact portion.

4. In an electrical connector as set forth in claim 3, wherein said spring contact portion of the terminal is bowed outwardly of said side of the housing and terminates in a free end near where said tab is located.

5. In an electrical connector as set forth in claim 1, wherein said housing includes a terminal-receiving cavity in which the terminal is received, with said spring contact portion of the terminal projecting outwardly through an opening in said side of the housing.

6. In an electrical connector as set forth in claim 5, wherein said board contact portion of the terminal also projects through said opening in said side of the housing, the board contact portion being reversely turned over the mounting face of the housing.

7. In an electrical connector as set forth in claim 6, wherein said board contact portion of the terminal comprises one leg of a U-shaped section of the terminal which embraces a wall of the housing.

8. In an electrical connector as set forth in claim 7, wherein said terminal includes a base fixed within said cavity in the housing, with the other leg of the U-shaped section of the terminal being joined to the base.

9. In a electrical connector as set forth in claim 1, wherein said board contact portion of the terminal comprises one leg of a U-shaped section of the terminal which embraces a wall of the housing.

10. In an electrical connector as set forth in claim 9, wherein said terminal includes a base fixed within said cavity in the housing, with the outer leg of the U-shaped section of the terminal being joined to the base.

11. In a electrical connector as set forth in claim 7, wherein said spring contact portion has a free end and said U-shaped section comprises said one leg and a second leg which legs are joined together at a bight section and wherein said second leg has a portion extending beyond said bight and located adjacent said free end.

12. An electrical connector, comprising: a dielectric housing having an interior cavity, a mounting face adapted for surface mounting on a printed circuit board, a first opening in a first side of the housing communicating with the cavity in a direction generally parallel to the board, and a second opening in a second side of the housing also communicating with the cavity in a direction generally parallel to the board; and a conductive terminal having a base insertable into the cavity in the housing through said first opening, a board contact portion joined to the base and fixed at the mounting face of the housing for engaging a circuit trace on the printed circuit board arranged so that the plane of the board contact portion will be parallel to the plane of the board when the housing is mounted to the board, and a spring contact portion having a bend axis perpendicular to the plane of the printed circuit board, joined to the base and projecting through said second opening in the housing for engaging a contact element of a mating connector component when the contact element is moved in an direction generally parallel to the board.

13. The electrical connector of claim 12 wherein said spring contact portion of the terminal is bowed outwardly of said second side of the housing.

14. The electrical connector of claim 12 wherein said spring contact portion of the terminal includes a tab, extending laterally from the spring contact portion, seated beneath a ledge extending parallel to the board on the housing to preload the spring contact portion.

15. The electrical connector of claim 14, wherein said spring contact portion of the terminal is bowed outwardly of said second side of the housing and terminates in a free end near where said tab is located.

16. The electrical connector of claim 12 wherein said board contact portion of the terminal comprises one leg of a U-shaped section of the terminal which embraces a wall of the housing.

17. The electrical connector of claim 16 wherein a second leg of the U-shaped section of the terminal is joined to the base of the terminal.

* * * * *